(12) United States Patent
Frison

(10) Patent No.: US 7,986,226 B2
(45) Date of Patent: Jul. 26, 2011

(54) REMOTE OUTPUT SYSTEM AND METHOD

(75) Inventor: Andrea Frison, Gorizia (IT)

(73) Assignee: Honeywell International Inc., Morristown, NJ (US)

(*) Notice: Subject to any disclaimer, the term of this patent is extended or adjusted under 35 U.S.C. 154(b) by 530 days.

(21) Appl. No.: 12/120,208

(22) Filed: May 13, 2008

(65) Prior Publication Data

US 2009/0284379 A1   Nov. 19, 2009

(51) Int. Cl.
G08B 1/00 (2006.01)

(52) U.S. Cl. ........ 340/531; 340/506; 340/507; 340/524; 340/691.6; 340/3.1

(58) Field of Classification Search .................. 340/506, 340/507, 524, 691.6, 3.1, 825.36, 825.49, 340/286.02
See application file for complete search history.

(56) References Cited

U.S. PATENT DOCUMENTS 5,959,529 A * 9/1999 Kail, IV .................. 340/539.12
* cited by examiner Primary Examiner — Daryl Pope
(74) Attorney, Agent, or Firm — Husch Blackwell

(57) ABSTRACT

An ambient condition monitoring system includes a plurality of detectors such as smoke detectors, gas detectors, or fire detectors. Each of the detectors has two sets of input/output ports. One port can communicate with a system control unit. The second port can communicate with a local wired network to which is coupled a plurality of output devices. The output devices can be activated by the respective detector using a modulated control signal.

20 Claims, 2 Drawing Sheets

REMOTE OUTPUT SYSTEM AND METHOD

FIELD

The invention pertains to ambient condition detectors which might be part of a monitoring system. More particularly, the invention pertains to such detectors which can communicate via a local medium with one or more output devices.

BACKGROUND

Various types of ambient condition monitoring systems are known. These include fire monitoring systems. Such systems usually include a common control unit, or panel which communicates via a wired or wireless medium, or both, with a plurality of ambient condition detectors such as smoke detectors, fire detectors, gas detectors or the like. Output devices such as horns, sounders or strobes can be coupled to the control unit via the same, or, a second, different medium.

Current fire detectors can be considered mainly as input devices, since they collect information from the environment and transmit it to the control panel. Their ability to interact with the environment, for example giving an audible message in case of alarm, is very limited, unless special combined devices (detectors with integrated sounder, strobes or both) or dedicated stand alone sounder/strobes are used.

Usually just 1 or 2 LEDs (light emitting diodes) are available as outputs. They have a limited number of states: steady on, steady off, blink whenever a valid communication has been received. Some detectors have another output, called "remote output", where the user can connect a load (typically an external LED) that can be controlled by the control panel in the same way as the detector's LED.

So the possibility for driving the user loads directly by the detector is very limited, just switching the output device on or off. With current systems, if it is necessary to install both a detector and an audio/visible device in a room (for example in a hotel room), either a combined device can be chosen (expensive both for the end user and the manufacturer) or a detector, a sounder and a strobe (or a combined sounder/strobe) must be installed (expensive for the user, increases system complexity for the control panel). It would be desirable to be able to reduce the cost and time of making such installations.

FIG. 1 illustrates a prior art system 10 which includes a system control unit or panel 12. Unit 12 could be implemented with one or more processors 12a and associated control software 12b.

System 10 includes a plurality of detectors 20, of which 20i is a member. These detectors communicate with the unit 12 via a bidirectional communications medium 14. Detectors, such as 20i include a remote output port which via a wire 22 can be used to drive an LED 24 as discussed above.

FIG. 2 illustrates additional details of detector 20i. The detector 20i can include a programmable processor or microcontroller 26-1 and associated control software. An internal power supply 26-2 can be energized via the medium 14, conductors 14a,b. A switch 26-3 under control of circuits 26-1 can be used to energize the LED 24 via conductor 22.

The signal on line 22 can be an intermittently applied voltage which causes the load 24 to blink and provide a visual status output.

DETAILED DESCRIPTION

Figure 1:
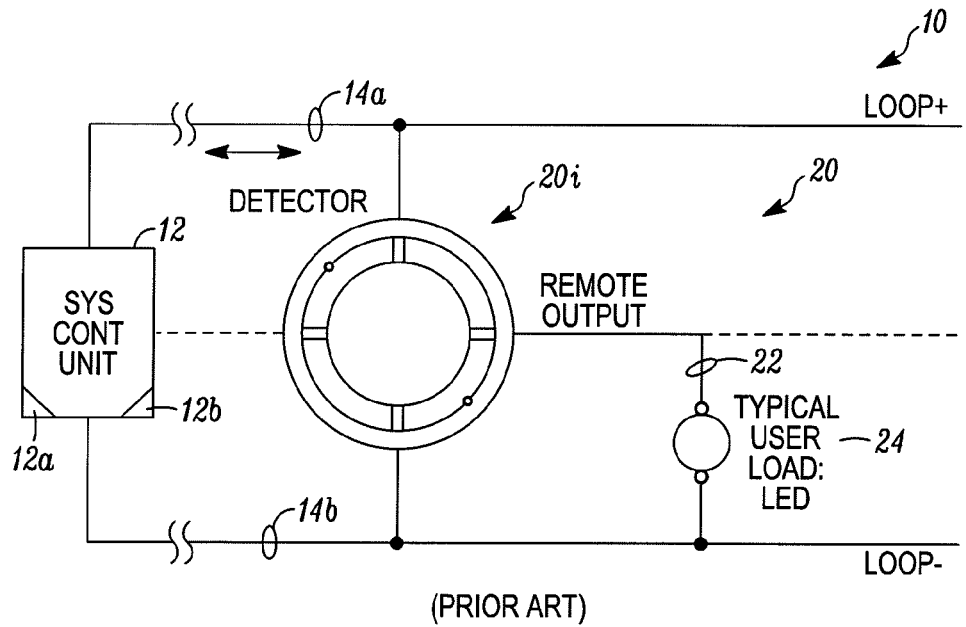
FIG. 1 is a diagram which illustrates a portion of a prior art detector system.
Figure 2:
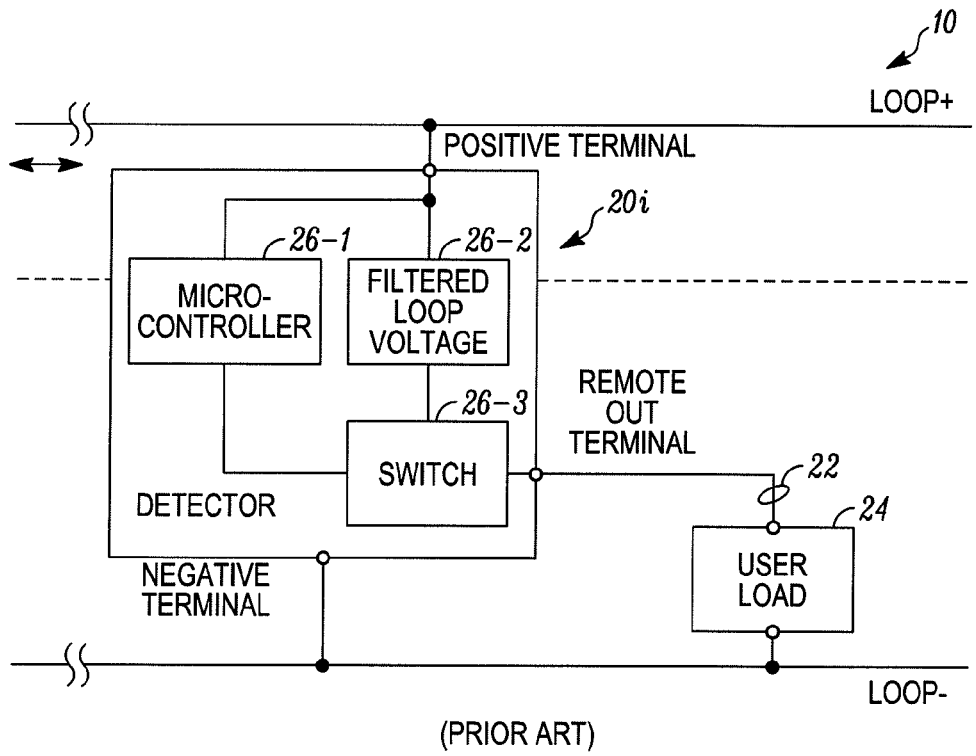
FIG. 2 is a more detailed diagram of the system of FIG. 1.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

Embodiments of the invention include ambient condition detectors having a remote device output circuit which includes a local input/output port to which are coupled a power supply for a displaced output device and circuits that implement a predetermined output device communications protocol. This input/output port can be coupled, via a local medium, to a variety of output devices such as sounders (with selectable tones), strobes (with different flash modes), solenoids or other types of actuators, another external LED, or input devices such as pull stations, or, switches all without limitation. Such embodiments make it possible to drive and control different output loads using a local medium. The local medium is different from a communications medium which the detector might use to communicate with a fire control unit or panel.

These loads will be activated directly by the detector, relieving part of the communication burden of the control panel. With embodiments of the invention, an output device such as a sounder or strobe can be easily coupled to a local detector where both devices need to be in relatively close proximity to one another. Such embodiments should reduce both device installation costs as well as cable installation costs.

In a disclosed embodiment, both the communications signals and the power supply can be provided at a common detector output contact or port. Amplitude, frequency or other types of modulation of the output voltage at the port can be used to communicate with the various output devices. Commands can be transmitted between the detector and the connected user load, or output devices, via a local medium such as an electrical cable.

The remote output driver of the respective detectors performs this modulation and receives an acknowledge from the respective output devices or load. The user loads include a decoding circuit to receive the command and to answer with an acknowledge signal. The control panel can program the detectors in advance with the commands that can be sent to the output devices when activated.

Figure 3:
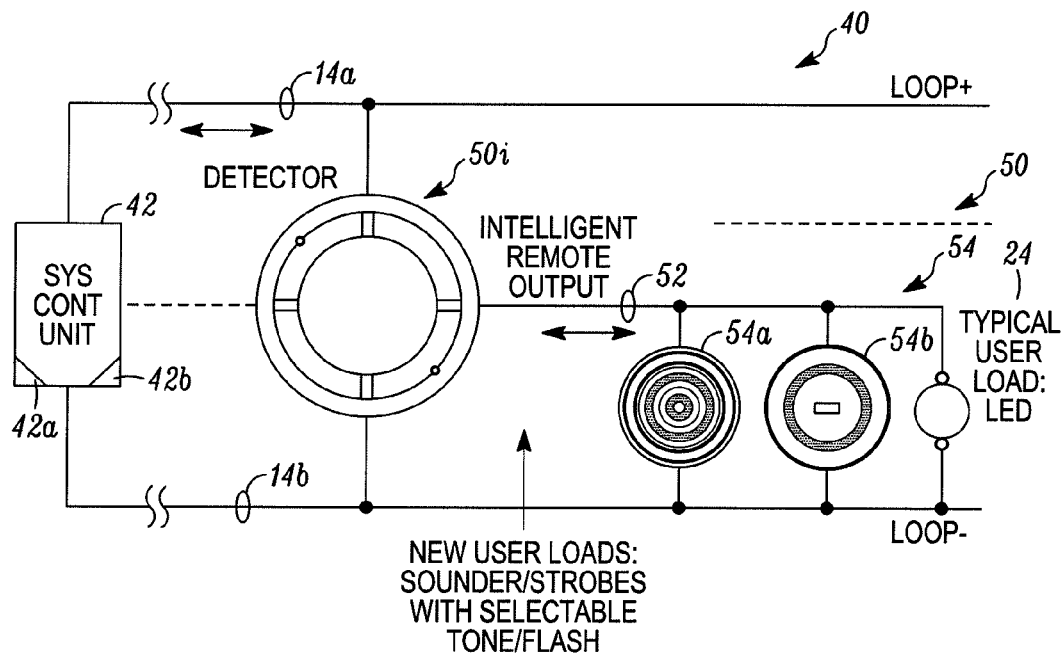
FIG. 3 is a diagram which illustrates a system which embodies the present invention.

FIG. 3 illustrates a system 40 which embodies the present invention. System 40 includes a monitoring system control unit or panel 42 which could be implemented with one or more processors 42a and associated software 42b which functions generally as described above.

Control unit 42 can be coupled via a wired or wireless bidirectional medium 14 to a plurality of detectors 50. Detector 50i is representative of the members of the plurality 50. Detector 50i includes an ambient condition sensor, such as a smoke sensor, a flame sensor, a thermal sensor or the like all without limitation. Detector 50*i* is coupled to elements 14*a,b* of medium 14 by terminals 50*i*-1,-2 best seen in FIG. 4.

Detector 50*i* can be coupled via a local medium 52 to a plurality of output devices 54 which could include sounders, strobes sounder/strobes, audible output devices, as well as one or more LEDs such as LED 24. The output devices 54 can be controlled locally by the detector 50*i*.

Figure 4:
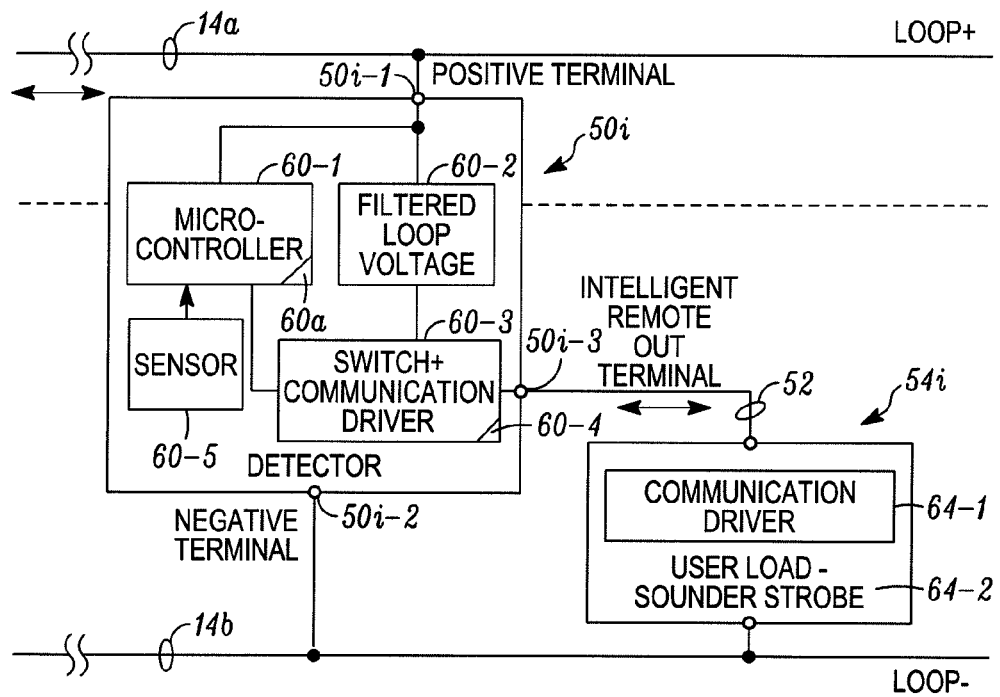
FIG. 4 is a more detailed diagram of the system of FIG. 3.

FIG. 4 illustrates additional details of the detector 50*i* as well as a representative output device such as 54*i*. Detector 50*i* can include a local processor 60-1, a power source 60-2 activated by electrical energy from conductors 14*a,b*, switch and communications driver circuitry 60-3 which might include acknowledgement detecting circuits 60-4. An ambient condition sensor 60-5 can be coupled to control circuits 60-1.

Detector 50*i* includes a local output port 50-3 which can be in bidirectional communication with output devices 54 via medium 52. Control circuits 60-1 can include local control software 60*a* which can include parametric information for purposes of controlling the devices 54. For example, detector 50*i* can selectively control tone, volume, or flash characteristics of the output devices 54 based on information prestored in circuits 60-1 and used by the control software 60*a*.

The output devices, such as 54*i* can include communications circuitry 64-1 which can respond to incoming modulated signals on medium 52 from output port 50*i*-3. Circuitry 64-1 can also generated acknowledgement, or response signals on the medium 52 which are to be received by circuits 60-3.

Circuits 64-1 can in turn drive the output devices 64-2 in accordance with the modulated signals received via medium 52. Those signals can specify output parameters such as tone or strobe output characteristics of the respective output device 64-2.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. An apparatus comprising:
a housing, the housing carrying a first port for coupling to a communications medium and a selected externally accessible second port for coupling to a local medium;
an ambient condition sensor carried by the housing; and
control circuits in the housing, coupled to the sensor, the control circuits include modulation circuits, responsive to a predetermined condition, which generate one of a frequency modulated or an amplitude modulated signal at the second port for controlling at least one output device coupled to the local medium.

2. An apparatus as in claim 1 where the modulated output signal can activate at least one of a strobe or a sounder.

3. An apparatus as in claim 2 where the control circuits respond to an acknowledgement signal received at the selected port.

4. An apparatus as in claim 1 where the sensor is selected from a class which includes a smoke sensor, a gas sensor, a fire sensor, an intrusion sensor, a position sensor, and a thermal sensor.

5. An apparatus as in claim 4 where the control circuits include storage to specify modulated signal output characteristics for at least one output device.

6. An apparatus as in claim 5 where the control circuits include storage to specify modulated signal output characteristics for a plurality of output devices.

7. An apparatus as in claim 5 where the control circuits include a programmable processor and executable control software.

8. An apparatus as in claim 7 where the software when executed, generates sequences of modulated output signals, at the port, the signals specify output characteristics of a plurality of predetermined output devices.

9. An apparatus as in claim 8 where the software responds to the existence of the predetermined condition and, subsequently generates a sequence of modulated output signals.

10. An ambient condition monitoring system comprising:
a plurality of ambient condition detectors with each of the detectors having a communications interface with a first port couplable to a respective communications medium;
a system control unit with a system port couplable to the communications medium where at least one of the detectors includes,
a housing, the housing carrying an externally accessible second port coupled to a local medium;
an ambient condition sensor carried by the housing; and
control circuits in the housing, coupled to the sensor, the control circuits include modulation circuits, responsive to a predetermined condition, which generate one of a frequency modulated or an amplitude modulated signal at the second port for controlling at least one output device coupled to the local medium.

11. A system as in claim 10 which includes a plurality of devices couplable to the second port of the at least one detector, the members of the plurality include input or output devices.

12. A system as in claim 11 where the output devices include audible output devices, visual output devices to indicate the presence of the predetermined condition, or actuators, the input devices include switches.

13. A system as in claim 12 where the control circuits of the at least one detector establish the presence of the predetermined condition.

14. A system as in claim 13 where the control circuits couple a signal indicative of the presence of the predetermined condition to a respective first port of the at least one detector.

15. A system as in claim 14 where the devices are coupled to the second port by a wired medium.

16. A system as in claim 15 where the detectors are coupled to the system control unit by a second, different medium.

17. A system as in claim 16 where the second medium includes, at least in part, one of a wired portion, or a wireless portion.

18. A system as in claim 12 where the devices include demodulation circuitry, circuitry that receives power from the second port, and control circuits responsive thereto.

19. A detector/output device combination comprising:
an ambient condition detector with first and second bidirectional interfaces and control circuits coupled therebetween, the first bidirectional interface for coupling to a system control unit, and the second bidirectional interface for coupling to an electrical conduit;
at least one output device selected from a class which includes an audible output device and a visual output device, the output device including a bidirectional communications interface; and
the electrical conduit coupled between the second bidirectional interface of the detector and the bidirectional communications interface of the output device, with the detector and the output device in bidirectional communication via the electrical conduit, and with the detector controlling the output device.

20. A combination as in claim 19 where the detector receives electrical energy from the other interface and which includes circuitry that couples at least a portion thereof, via the one interface, to the output device.

* * * * *